(12) United States Patent
Parry

(10) Patent No.: US 6,972,863 B2
(45) Date of Patent: Dec. 6, 2005

(54) DIRECT BARCODE PRINTING FROM INTERNET DATABASE

(75) Inventor: Travis J. Parry, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 807 days.

(21) Appl. No.: 09/810,258

(22) Filed: Mar. 19, 2001

(65) Prior Publication Data

US 2002/0131071 A1 Sep. 19, 2002

(51) Int. Cl.⁷ .................................................. B41J 1/00
(52) U.S. Cl. .................................... 358/1.15; 358/1.14
(58) Field of Search ................................ 358/1.5, 1.12, 358/1.13, 1.14, 1.15, 434, 1.18; 707/3, 5, 707/10, 15; 709/224; 710/62

(56) References Cited

U.S. PATENT DOCUMENTS

| | | | |
|---|---|---|---|
| 5,848,413 A * | 12/1998 | Wolff | 707/10 |
| 5,873,077 A * | 2/1999 | Kanoh et al. | 707/3 |
| 5,956,487 A | 9/1999 | Venkatraman et al. | 395/200.48 |
| 6,348,970 B1 * | 2/2002 | Marx | 358/1.15 |
| 6,375,078 B1 | 4/2002 | Russell et al. | |
| 6,429,946 B1 * | 8/2002 | Bresnan et al. | 358/1.15 |
| 6,434,561 B1 | 8/2002 | Durst, Jr. et al. | |
| 6,537,324 B1 | 3/2003 | Tabata et al. | |
| 6,609,843 B2 | 8/2003 | Mahoney et al. | |
| 6,738,841 B1 * | 5/2004 | Wolff | 710/62 |
| 2003/0030834 A1 | 2/2003 | Travis | |
| 2003/0030840 A1 | 2/2003 | Travis | |
| 2003/0030841 A1 | 2/2003 | Travis | |
| 2005/0024682 A1 * | 2/2005 | Hull et al. | 358/1.18 |

OTHER PUBLICATIONS

Digital: Convergence, "CRQ and CueCat" (Jan. 1, 2001) available at http://www.digitalconvergence.com/products/index.html.

* cited by examiner

Primary Examiner—Kimberly Williams
Assistant Examiner—Satwant Singh

(57) ABSTRACT

A printing method, includes receiving data at a printer; detecting a barcode in the received data; translating the barcode to an external network address; sending on the Internet or other external network an access request for a document to the external network address; retrieving the document from the external network address; and printing the document. In a further aspect of the present invention, the step is provided of printing the document inside a master document.

24 Claims, 4 Drawing Sheets

US 6,972,863 B2

DIRECT BARCODE PRINTING FROM INTERNET DATABASE

FIELD OF THE INVENTION

The present invention relates generally to the field of printers, fax machines, and copiers, and more particularly, to such devices which access documents either directly or indirectly from the internet.

SUMMARY OF THE INVENTION

Briefly, the present invention comprises, in one embodiment, a printing method, comprising the steps of: receiving data at a printer; detecting a barcode in the received data; translating the barcode to an external network address; sending on the Internet or other external network an access request for a document to the external network address; retrieving the document from the external network address; and printing the document.

In a further aspect of the present invention, the network address is a URL.

In a yet further aspect of the present invention, the receiving data step comprises receiving an e-mail containing the data.

In a further aspect of the present invention, the receiving data step comprises receiving an e-mail with an attachment containing the data.

In a further aspect of the present invention, the translating step comprises translating the barcode to obtain a PIN#; and wherein the sending step includes sending the PIN# with the access request to the external network address for determining if the request is authorized.

In a further aspect of the present invention, the detecting a barcode step comprises interpreting a wrapper indicating that a binary sequence is a barcode.

In a further aspect of the present invention, the steps are provided of: displaying a menu of print formats for a user to select to print the document; and receiving a selection of one of the print formats displayed to the user.

In a further aspect of the present invention, the steps are provided of: displaying a field for a transmission address; receiving a transmission address for another device in the field; and sending the document to the another device.

In a further aspect of the present invention, the translated barcode includes information on printing the document inside another document; and further comprising the step of printing the document inside the other document in accordance with the printing information upon receipt of the document at the printer.

In a further aspect of the present invention, the step is provided of printing the document inside a master document.

In a further aspect of the present invention, the translation step comprises translating the barcode to obtain at least one identifier that designates the type of contents in the document; and determining a location of the document within the master document based on the identifier.

In a further aspect of the present invention, the translation step comprises translating the barcode to obtain coordinates designating a portion of the master document; and determining a location of the document within the master document based on the coordinates.

In a further aspect of the present invention, the step is provided of determining a location of the document within the master document based on a rule.

In a further aspect of the present invention, the document and the master document are merged to form a single document in a desired format.

In a further aspect of the present invention, the detecting a barcode step comprises detecting a plurality of barcodes; and further comprising determining a URL in each of the plurality of barcodes; sending on the Internet an access request to each of the URL's; retrieving a document from each of the URL's; merging the documents from the URL's with the master document to obtain a merged document; and printing the merged document.

In a further embodiment of the present invention, there is provided a printing method, comprising the steps of: receiving data at a printer; detecting a barcode in the received data; translating the barcode to a URL; searching for an Internet access device to access the Internet; sending through the Internet access device an access request for a document to the URL; retrieving to the Internet device the document from the URL; and printing the document.

In a further aspect of the present invention, the receiving data step comprises receiving an e-mail containing the data.

In a further aspect of the present invention, the translating step comprises translating the barcode to obtain a PIN#; and wherein the sending step includes sending the PIN# with the access request to the URL for determining if the request is authorized.

In a further aspect of the present invention, the translated barcode includes information on printing the document inside another document; and further comprising the step of printing the document inside the other document in accordance with the printing information upon receipt of the document at the printer.

In a further aspect of the present invention, the step are provided of printing the document inside a master document.

In a yet further embodiment of the present invention, there is provided a system for printing documents, comprising: a first component for receiving data at a printer; a second component for detecting a barcode in the received data; a third component for translating the barcode to an external network address; a fourth component for sending on the Internet or other external network an access request for a document to the external network address; a fifth component for retrieving the document from the external network address; and a sixth component for printing the document.

In a yet further embodiment of the present invention, there is provided a program product for printing documents, comprising: first code for receiving data at a printer; second code for detecting a barcode in the received data; third code for translating the barcode to an external network address; fourth code for sending on the Internet or other external network an access request for a document to the external network address; fifth code for retrieving the document from the external network address; and sixth code for printing the document.

DETAILED DESCRIPTION OF THE PREFERRED EMBODIMENTS

Figure 1:
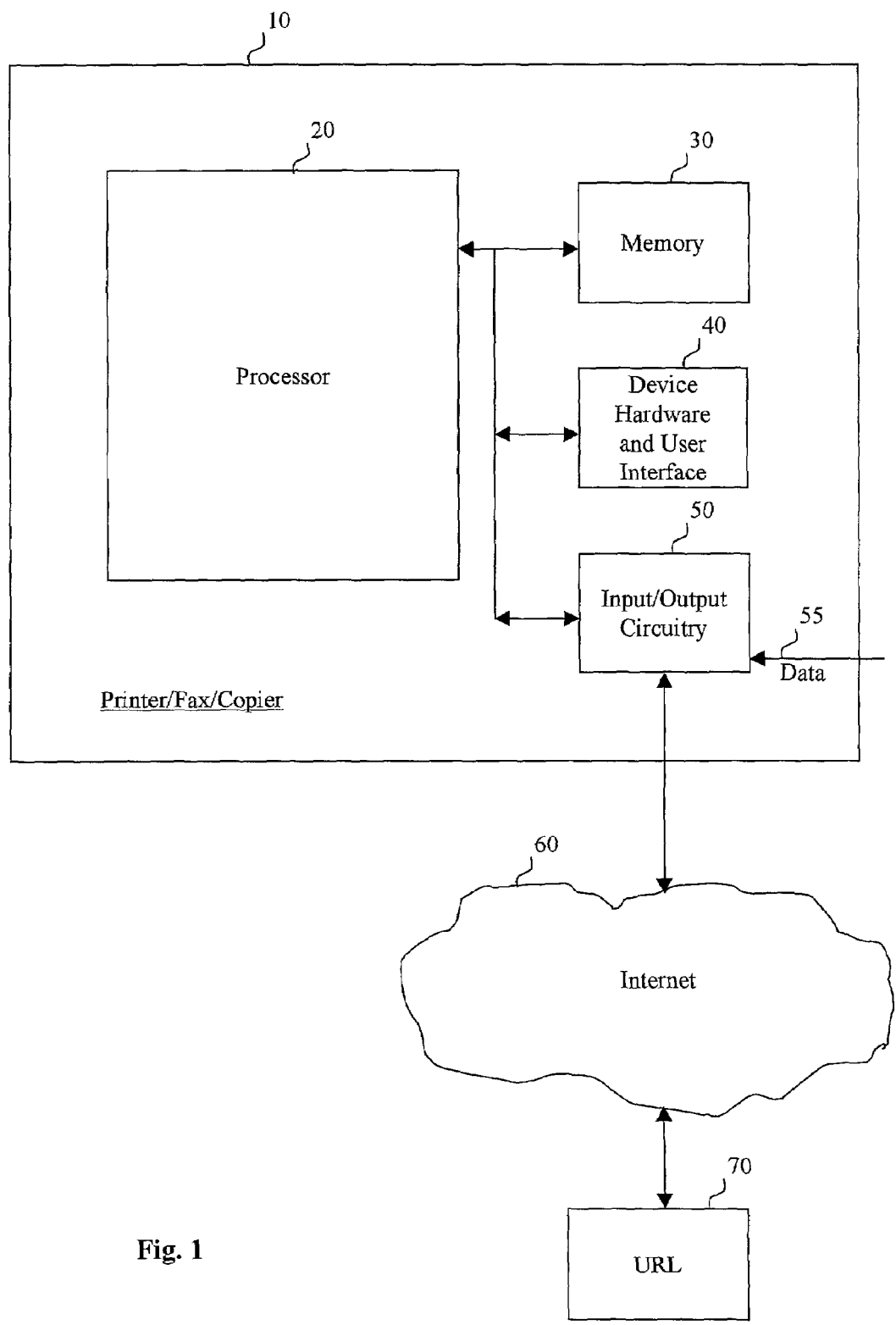
FIG. 1 is a schematic block diagram of an overall system which may be utilized to implement the present invention.

A preferred embodiment of the present invention is implemented utilizing a printer 10. One skilled in the art will recognize that the implementation to be described may also be applied to a facsimile machine or a copier machine. In one embodiment of the implementation of the present invention, the printer 10 may include a processor 20, a memory 30, device specific hardware and a user interface 40, and input/output circuitry 50. The processor 20 performs device specific functions for the device 10 in combination with the device specific hardware 40. In the embodiment where the device 10 is a printer, the processor 20 and the memory 30 perform image rendering functions and the device specific hardware 40 includes printer hardware and associated circuitry. The input/output circuitry 50 for such a printer provides network access to the printer device 10. It is preferred that the device specific hardware and user interface 40 include a display screen for providing information and selection options to a user, as well as various buttons and other controls for the user to make selections.

In a preferred embodiment of the present invention, web server functionality is embedded in the printer device 10 by providing software or firmware for the processor 20, by utilizing space available in the memory 30 and by using the existing input/output circuitry 50 such as Ethernet circuitry to transfer HTML files. Implementations of such web access software are widely available in the art. This web access software on the processor 20 would operate to access a URL (Universal Resource Locator) or other external network address at a remote device 70 by means of the internet 60 or other external network. The purpose for this access to the URL at the device 70, which will be explained in more detail below, is to retrieve a document thereat for printing at the printer device 10 or another printer selected by the user.

In an alternative embodiment, the web server functionality need not be included in the device 10. Rather the input/output circuitry 50 can be connected to a communications network to thereby connect to an internet access device (not shown) for accessing a URL 70 or other external network address via the internet 60. By way of example, this communications network could be a wide area network (WAN), an internetwork, a public telephone network or a private value added network (VAN). Alternatively, the communications network could be implemented using any combination of these different kinds of communications networks. A desired URL would be sent to this internet access device on the communications network to thereby access the web and a document on the URL 70.

Figure 2:
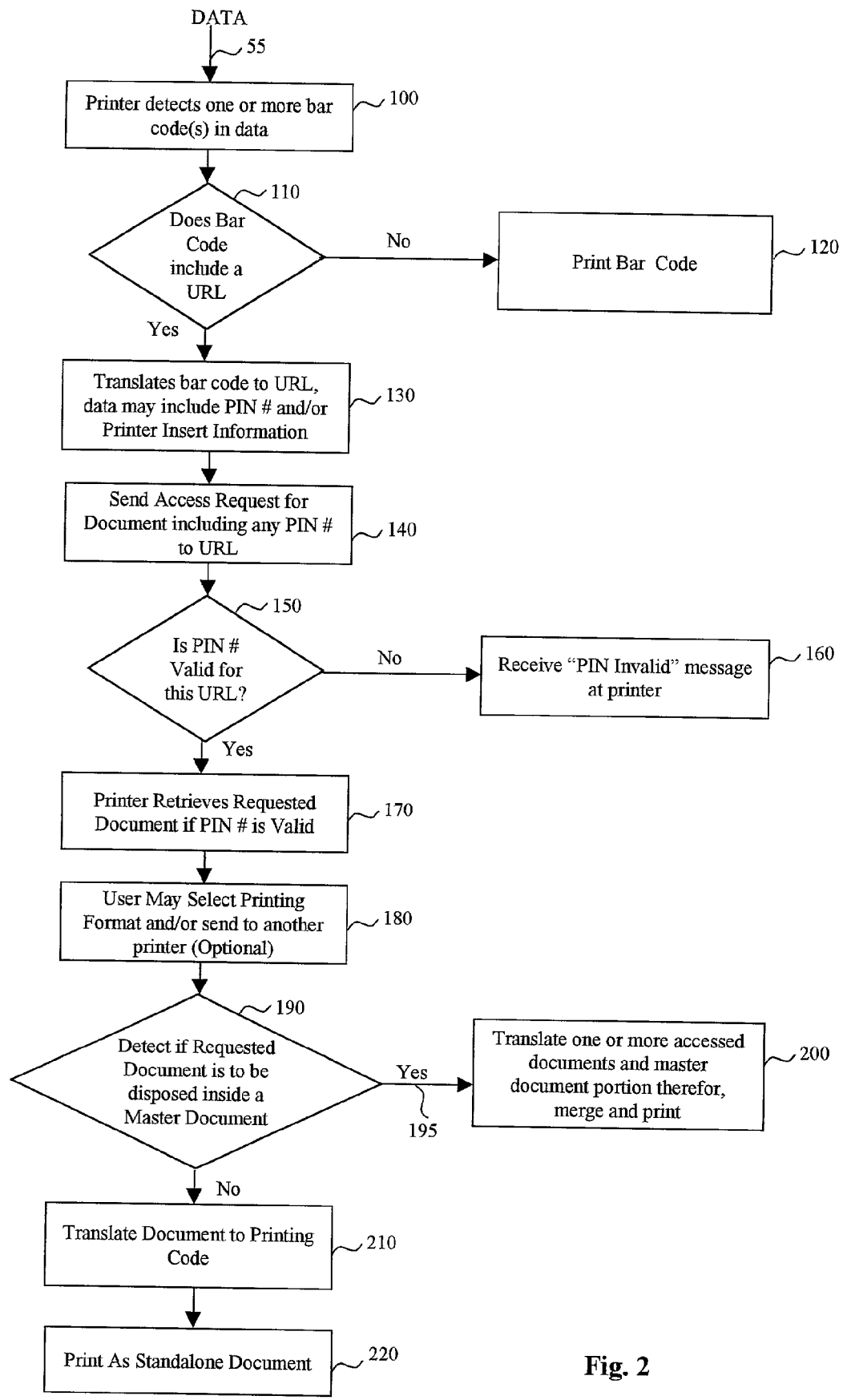
FIG. 2 is a block diagram flow chart of the method steps and computer program which may be utilized to implement a preferred embodiment of the present invention.

Referring now to FIG. 2, a preferred embodiment of the method and system and program product of the present invention which may be implemented using the structure of FIG. 1 is shown.

As a first step of the method, data is applied on line 55 to the input/output circuitry 50 of the device 10. This represented in FIG. 2 by the line 55. By way of example, this data could be a print stream. Alternatively, this data could comprise an email, or an attachment to an email. The first step in the execution is for the printer or other device 10 to detect one or more barcodes in the data on line 55. If the printer processor 20 detects at least one barcode in the data, then the execution moves to block 110 wherein it is determined whether the barcode includes a URL. By way of example, but not by way of limitation, the barcode could be detected by interpreting a wrapper that indicates that a binary sequence is a barcode. If no URL embedded in the barcode is detected in the data stream on line 55, then the execution moves to block 120 and the barcode is printed as regular data. Alternatively, if a barcode does include a URL, then the execution moves to block 130.

Block 130 translates the barcode to a URL. In one embodiment, the barcode may additionally include a PIN number which may be used to verify authorization to access the remote URL. Additionally, the barcode may also include printer insert information if the document to be retrieved from the remote URL is to be inserted inside a master document. This printer insert information may include, by way of example but not by way of limitation, coordinates within a portion of the master documents such as a page, at which the URL document is to be inserted, or other information such as a URL document type which may be utilized in accordance with a rule to determine where to insert the URL document within the master document. For example, a map document at the URL may be designated with the document type "MAP", and inserted to a location in the master document labeled "MAP".

The execution then moves to block 140 wherein an access request is generated and sent on the internet 60 to retrieve the document at this URL. As noted above, this access request may include a PIN number.

In block 150 it is determined whether a PIN number, if one is present, is valid for this URL. If the PIN number is not valid, then the message "PIN Invalid" is received at the printer, per block 160. Alternatively, if the PIN number is determined to be valid for the access URL, then the execution moves to block 170.

At block 170, the printer retrieves the requested document. Optionally, the execution may then move to block 180 wherein the device hardware and user interface 40 displays printing format selection options to a user. Additionally, or alternatively, the option to send this retrieved document to another printer may be provided. For this optional execution block, the user would be given the opportunity by means of various buttons and other appropriate controls to make a selection of the printing format and/or transmission of the document to another printer or other appropriate device. Note that this optional execution block 180 could be located anywhere within the process.

The execution then moves to block 190 wherein it is detected if the requested document is to be disposed inside a master document. If the answer is NO, then the execution moves to block 210 and the retrieved URL document is translated to printing code. Note that the retrieved URL document will include format information for the layout of the document. The execution then moves to block 220 wherein the translated document is printed on the device hardware 40 under the control of the processor 20.

Alternatively, if it is determined that the retrieved URL document is to be disposed inside a master document, then the execution moves to block 200. In block 200, one or more retrieved URL documents and a master document portion or the master document in its entirety are translated into a predetermined format, merged and printed.

Figure 3:
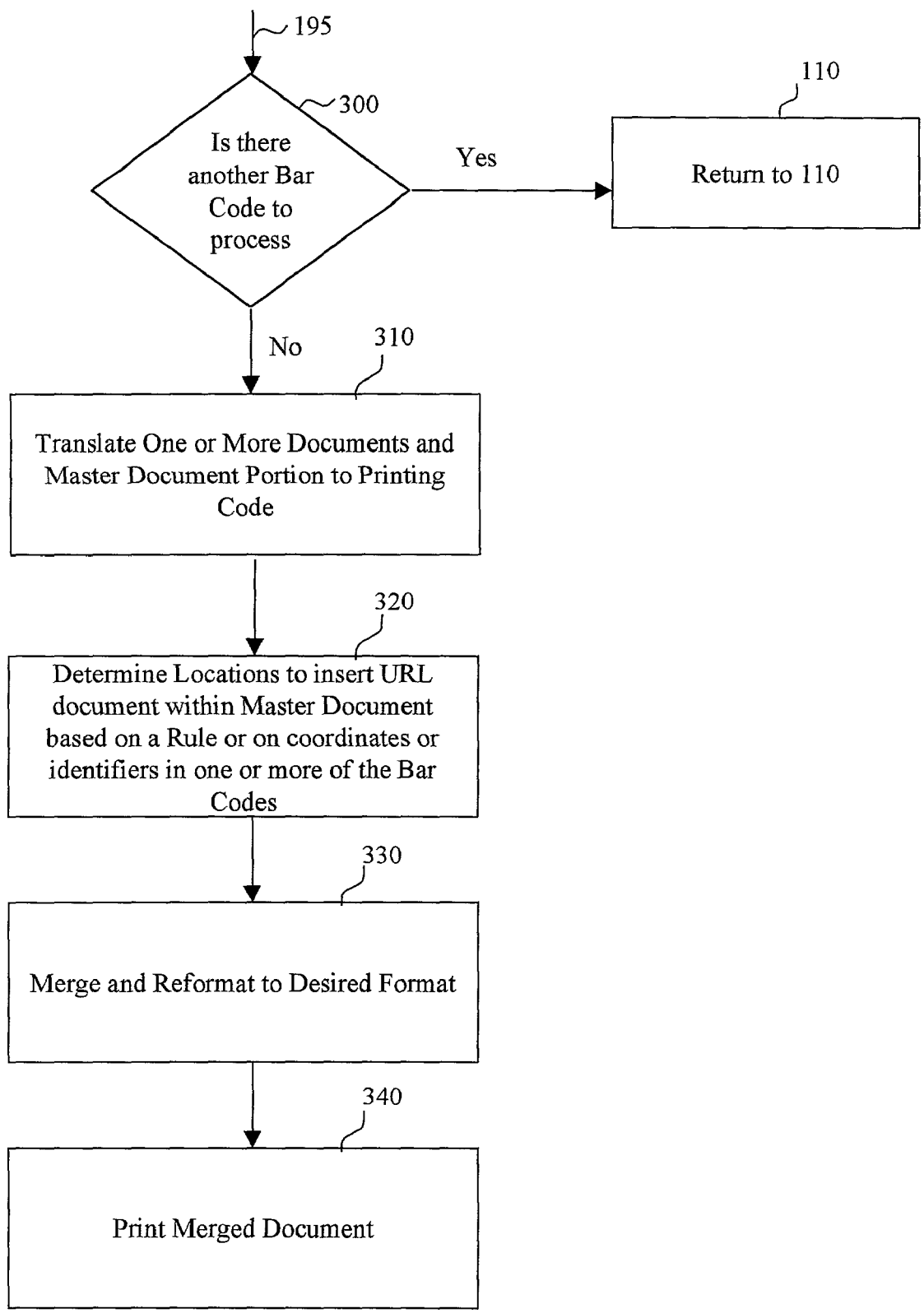
FIG. 3 is a block diagram flow chart providing further details of block 200 in FIG. 2.

Referring now to FIG. 3, additional method and operational details are provided for the execution block 200. Referring to FIG. 3, the retrieved URL document is applied on line 195 to block 300. In execution block 300, it is determined whether there is another bar code to process. If the answer is YES, then the execution returns to block 110 in FIG. 2 wherein it is determined whether the barcode includes a URL. If the barcode does include a URL, then the process continues as described for FIG. 2 in order to access and retrieve a desired document at the remote URL. Multiple different documents at a variety of different remote URL's may be retrieved in this manner and returned to the device 10. When all of the barcodes on the master document portion that is to be printed have been translated and the URL's accessed and the URL documents retrieved, then the execution moves to block 310.

It should be noted that depending on the printing software utilized, it may be desirable to perform this process on a page by page basis, or more generally, a portion by portion basis, for the master document. Accordingly, all of the barcodes on a particular page that is to be printed are accessed so that those URL documents can be merged into that particular master document page. That document page would then be printed, and the printer would then move on to the next page in the master document and search for barcodes in the printing data therefore. Alternatively, the printing software may detect all of the barcodes in the entire master document and retrieve the documents at the various remote URL's to allow the translation and merger of those URL documents with the master documents in one operation. Whether the software utilized operates on a portion by portion basis or retrieves all of the URL's for the entire master document at one time is a design choice within the skill of the art.

If there are no more barcodes to be translated and URL documents to be accessed for the portion of the master document to be printed, then the execution moves to block 310 wherein the one or more URL documents and the master document portion are translated to printing codes.

The execution then moves to block 320 wherein it is determined in which location or locations to insert the URL documents within the master documents. The locations for insertion of the various URL retrieved documents within the master document may be based on coordinates included within each of the different barcodes. Alternatively, the locations may be determined in accordance with a rule. By way of example, by not by way of limitation, the rule could comprise simply inserting into a set of blocks within the master document the URL documents in the order in which their barcodes were detected. Alternatively, this rule could comprise using an identifier translated from each of the different barcodes to insert the respective document associated with that barcode to a space which is identified by the respective identifier within that document. By way of example, an identifier could identify the document type to be an "EXECUTIVE SUMMARY", and there could be an insert box within the master document which includes an identifier "EXECUTIVE SUMMARY" that matches the identifier.

The execution then moves to block 330 wherein the one or more URL documents and the master document portion are merged and reformatted to a desired format. By way of example but not by way of limitation, a typical format for printing would be PCL or Postscript. The execution then moves to block 340 wherein the merged document portion or the entire document is printed by the device hardware 40.

Figure 4:
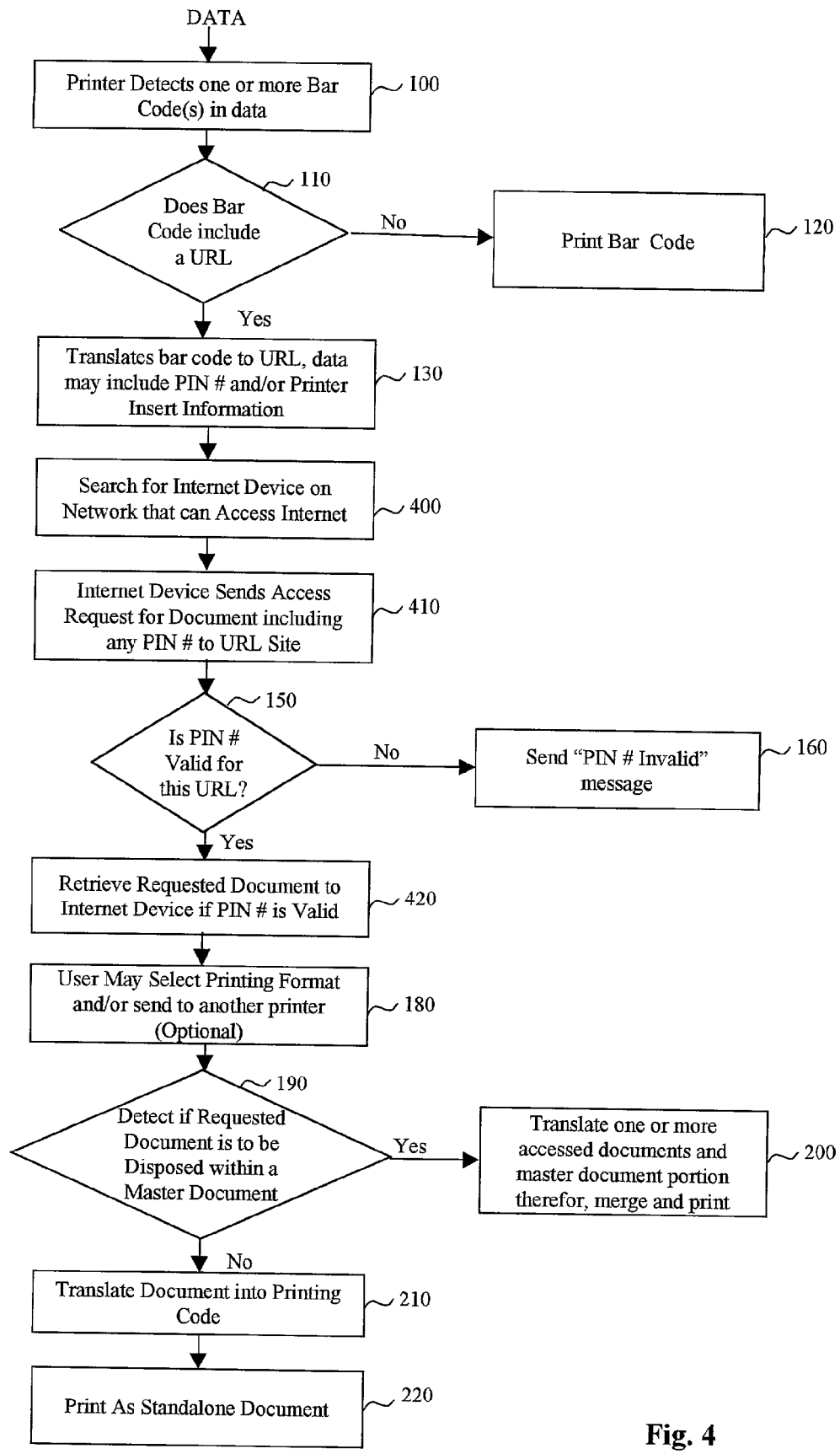
FIG. 4 is a block diagram flow chart of the method steps and the computer program to implement another embodiment of the present invention.

Referring now to FIG. 4, there is shown an embodiment of the present invention wherein web access capability is not available at the device 10. In this embodiment, all of the execution blocks with identical numbers to the blocks in FIG. 2 operate in a similar fashion and will not be discussed. However, in this situation where there is no web access capability within the device 10, then after the barcode is translated to a URL in block 130, the execution moves to block 400 wherein a search query is sent out on a communications network via the input/output circuitry 50 (FIG. 1) to connect to an internet access device for accessing the web. By way of example, this communications network could simply comprise an intranet and the access could be to web access software module or to a web server on the intranet. This internet access device would then be utilized to access the URL 70 by means of the internet 60. This operation is illustrated by the execution block 410. If the PIN number, if any, is determined to be valid by this URL 70, then the requested document is retrieved back to the internet device, and from that device it is provided via the block 420 to the printer device 10 for printing as described previously for FIG. 2.

It should be noted that the present invention is particularly advantageous for summary reports, wherein various sections of the report are being continuously updated. The present invention, by means of the insertion of one or more barcodes within a master document, allows a report to be updated on the fly by accessing a plurality of different URL's which are maintained with up to date information. In one aspect, a company could maintain a variety of its documents on the internet but accessible only by means of a PIN number or some other security operation. This invention would allow access to such documents without the need for firewalls. Additionally, the present invention is particularly advantageous in that it provides an accurate rendition of a URL, via the translation of a barcode, without the need for human intervention with the potential for typographical errors. Accordingly, an error free transmission of a document to a printer or other device such as a fax machine or copier, can be accomplished simply by sending an email with one or more barcodes embedded therein.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A printing method, comprising the steps of:

receiving print stream data at a printer;

detecting a barcode in the received print stream data;

translating the barcode to an external network address;

sending on the Internet or other external network an access request for a document to the external network address;

retrieving the document from the external network address;

selecting at least one portion of the document retrieved from the external network address;

merging the at least one selection portion of the retrieved document from the network address into a second document, at least part of which is defined by the print stream data, to form a modified document; and printing the modified document.

2. The method as defined in claim 1, wherein the network address is a URL.

3. The method as defined in claim 1, wherein said print stream data receiving step comprises receiving an e-mail containing said print stream data.

4. The method as defined in claim 1, wherein said print stream data receiving step comprises receiving an e-mail with an attachment containing said print stream data.

5. The method as defined in claim 1, wherein said translating step comprises translating the barcode to obtain a PIN#; and wherein said sending step includes sending the PIN# with the access request to the external network address for determining if the request is authorized.

6. The method as defined in claim 1, wherein the detecting a barcode step comprises interpreting a wrapper indicating that a binary sequence is a barcode.

7. The method as defined in claim 1, further comprising the steps of:
displaying a menu of print formats for a user to select to print the modified document; and
receiving a selection of one of said print formats displayed to the user.

8. The method as defined in claim 1, further comprising the steps of:
displaying a field for a transmission address;
receiving a transmission address for another device in said field; and
sending the retrieved document to said another device.

9. The method as defined in claim 1, wherein the translated barcode includes:
information on inserting the at least one portion of the retrieved document inside the second document; and
further comprising the step of inserting the at least one portion of the retrieved document inside the second document in accordance with the printing information upon receipt of the retrieved document at the printer.

10. The method as defined in claim 1, further comprising the step of inserting the at least one portion of the retrieved document inside a master document.

11. The method as defined in claim 10, wherein the translation step comprises;
translating the barcode to obtain at least one identifier that designates the type of contents in said retrieved document; and
determining a location for insertion of the at least one portion of the retrieved document within the master document based on said identifier.

12. The method as defined in claim 10, wherein the translation step comprises:
translating the barcode to obtain coordinates designating a portion of the master document; and
determining a location for insertion of the at least one portion of the retrieved document within the master document based on said coordinates.

13. The method as defined in claim 10, further comprising the step of determining a location of the at least one portion of the retrieved document within the master document based on a rule.

14. The method as defined in claim 10, wherein the at least one portion of the retrieved document and the master document are merged to form the modified document in a desired format.

15. The method as defined in 10, wherein said detecting a barcode step comprises;
detecting a plurality of barcodes; and further comprising:
determining a URL in each of the plurality of barcodes;
sending on the Internet an access request to each of the URL's;
retrieving a document from each of the URL's;
merging at least portions of the retrieved documents from the URL's with the master document to obtain a merged document; and
printing the merged document as the modified document.

16. The method as defined in claim 10, wherein the master document is defined, at least in part, by the print stream data.

17. The method as defined in claim 10, wherein the master document comprises, at least in part, the second document.

18. A printing method, comprising the steps of:
receiving print stream data at a printer;
detecting a barcode in the received print stream data;
translating the barcode to a URL;
searching for an Internet access device to access the Internet;
sending through the Internet access device an access request for a document to the URL;
retrieving to the Internet device the document from the URL;
selecting at least one portion of the document retrieved from the URL;
merging the at least one selection portion of the document retrieved from the URL into a second document which is at least in part defined by the print stream data to form a modified document; and
printing the modified document.

19. The method as defined in claim 18, wherein said receiving data step comprises receiving an e-mail containing said print stream data.

20. The method as defined in claim 18, wherein said translating step comprises translating the barcode to obtain a PIN#; and wherein said sending step includes sending the PIN# with the access request to the URL for determining if the request is authorized.

21. The method as defined in claim 18, wherein the translated barcode includes:
information on inserting the at least one portion of the retrieved document inside the second document; and
further comprising the step of inserting the at least one portion of the retrieved document inside the second document in accordance with the printing information upon receipt of the document at the printer.

22. The method as defined in claim 18, further comprising the step of inserting the at least one part of the retrieved document inside a master document which is at least in part defined by the print stream data, to form the modified document.

23. A system for printing documents, comprising:
a first component for receiving print stream data at a printer;
a second component for detecting a barcode in the received print stream data;
a third component for translating the barcode to an external network address;
a fourth component for sending on the Internet or other external network an access request for a document to the external network address;
a fifth component for retrieving the document from the external network address; and
a sixth component for inserting at least part of the retrieved document in another document which is at least in part defined by the print stream data, and for printing the other document after insertion of the at least part of the retrieved document.

24. A program product for printing documents, comprising:
- a computer readable medium having machine readable program code embodied therein to be executed by a computer, the machine readable program code comprising:
- first code for receiving print stream data at a printer;
- second code for detecting a barcode in the received print stream data;
- third code for translating the barcode to an external network address;
- fourth code for sending on the Internet or other external network an access request for a document to the external network address;
- fifth code for retrieving the document from the external network address;
- sixth code for merging at least a portion of the document with at least a portion of the print steam data and forming a modified document; and
- seventh code for printing the modified document.

* * * * *